INVENTOR
ANTHONY D'ONOFRIO

Fig_2

Feb. 13, 1962  A. D'ONOFRIO  3,020,996
SYSTEMS FOR AUTOMATICALLY CONTROLLING LINE FEEDING
AND TABULATING MECHANISMS IN TYPEWRITERS
OR LIKE MACHINES
Filed Sept. 1, 1959  7 Sheets-Sheet 3

INVENTOR
ANTHONY D'ONOFRIO
BY
Thomas S. Ross
Joseph R. Spalla
ATTORNEYS

Fig_6

Fig_7

Fig_9

United States Patent Office 3,020,996
Patented Feb. 13, 1962

3,020,996
SYSTEMS FOR AUTOMATICALLY CONTROLLING LINE FEEDING AND TABULATING MECHANISMS IN TYPEWRITERS OR LIKE MACHINES
Anthony D'Onofrio, West Hartford, Conn., assignor to Royal McBee Corporation, Port Chester, N.Y., a corporation of New York
Filed Sept. 1, 1959, Ser. No. 837,391
18 Claims. (Cl. 197—133)

This invention relates to systems for automatically controlling line feeding and tabulating mechanisms in typewriters or like machines; more particularly it relates to an integrated line feeding and tabulating mechanism control system having a photoresponsive device for detecting marks on a form whose progress through the typewriter is to be controlled; and specifically it relates to a control system wherein the photoresponsive device is employed in combination with novel logic circuitry adapted to control the extent of line feeding and tabulating advance of a form in the typewriter.

The detection of conductive marks or the photoelectric detection of marks on forms is broadly old. In particular conductive mark detection devices for controlling tabulating advance of a typewriter carriage in accordance with marks on a form in a typewriter have been advanced. Aside from wear, a major disadvantage of these conductive mark detectors for controlling carriage movement lies in the fact that close proximity to the form is mandatory in the area where the type bars strike the platen. Furthermore, inasmuch as any number of copies may be required, the distance between the paper and the detector has to be made variable introducing an added adjustment. Another disadvantage resides in the fact that the forms used with such detectors must be specially printed with conductive ink.

In accordance with the invention the disadvantages inherent in conductive mark detectors for controlling typewriter carriage position are overcome through employment of a photoelectric mark detector which also serves to control platen indexing. Briefly, the invention comprises in combination with a single photoelectric detector, novel circuitry, including circuitry for delivering power to line feeding and tabulating mechanism control actuators, which overcomes difficulties heretofore encountered with photoelectric devices as a result of changes in ambient light intensity and voltage fluctuations, and which is effective only when line feed or tab operations are initiated; serving thereafter to control the extent of line feeding and tabulating in accordance with prepositioned marks on a form in the typewriter.

An object of the invention is to provide a novel vertical and horizontal format control system for typewriters or like machines.

Another object of the invention is the provision of a format control system which reduces a typist's work load by eliminating tabulation set up time and extra tab and line feed key strokes.

Another object of the invention is the provision of a system for automatically controlling the progress of a form in a typewriter in accordance with marks photoelectrically sensed therefrom.

Another object of the invention is to provide a photoelectric form sensing control system for automatically controlling line feeding and tabulating mechanisms in a typewriter which is unaffected by changes in ambient light and voltage fluctuations.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

The typewriter mechanism shown by way of example as embodying the invention in a preferred form is generally similar in many respects to the present Royal Electric Office Typewriter. Consequently only so much of the typewriter mechanism necessary to understand the invention is shown in the figures.

Figure 1:
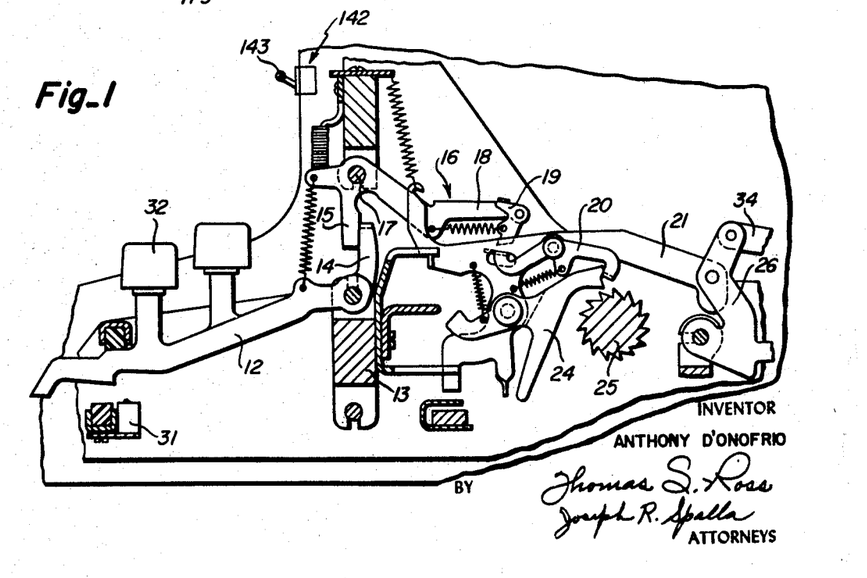
FIGURE 1 is a side elevation of typewriter function powering mechanism.

Referring now to the figures wherein like reference numerals designate like or corresponding parts throughout the several views the mechanism comprises as shown in FIGURE 1, key operated levers 12 pivoted on a cross bar 13 which are provided with upward projections 14 disposed behind arms 15 of levers 16 pivoted on the frame cross bar as at 17. Each lever 16 has another arm 18 on which a limber dog or flipper 19 is pivoted. Clockwise movement of arm 18 causes flipper 19 to rotate a pawl latch member 20, which is pivoted to an actuator 21 to release a pawl 24 carried by the actuator into a continuously running snatch roll 25. The snatch roll then drives the pawl and actuator forwardly (to the left) so as to rock a bell crank lever 26 associated, for example, with tabulate and carriage return keys.

Figure 2:
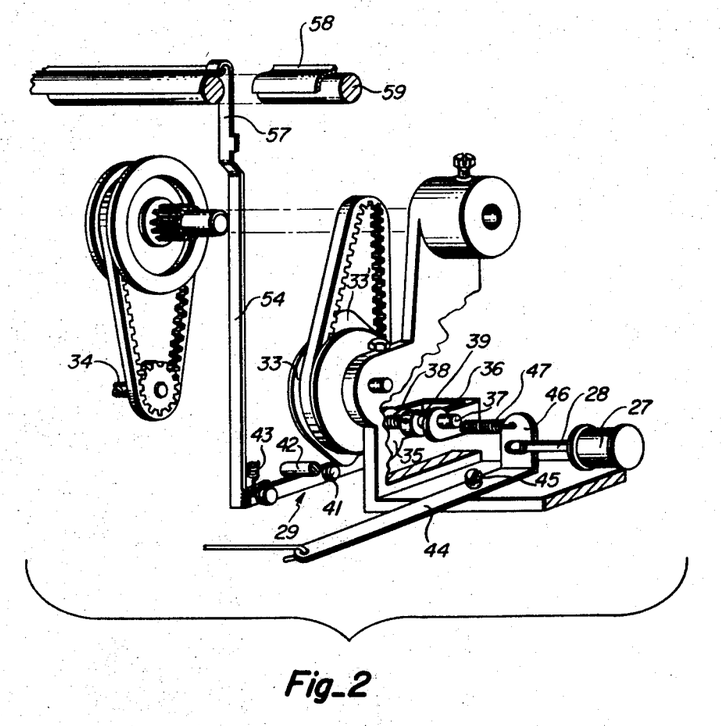
FIGURE 2 is a perspective view of line feed mechanism.

In accordance with the invention the Royal Electric Office Typewriter repeat line space construction partially shown in FIGURE 2 and more particularly described in Patent 2,728,438 is modified for operation by a line feed solenoid 27 suitably mounted on the typewriter frame and having its armature 28 connected so as to move a cam follower generally designated by reference numeral 29. The solenoid 27 is adapted to be energized upon closure of a skip switch 31 (FIGURE 1) operable by a dummy key 32 on the typewriter, and as will hereinafter be explained, upon closure of a switch operable in response to a carriage return operation.

Figures 3, 11:
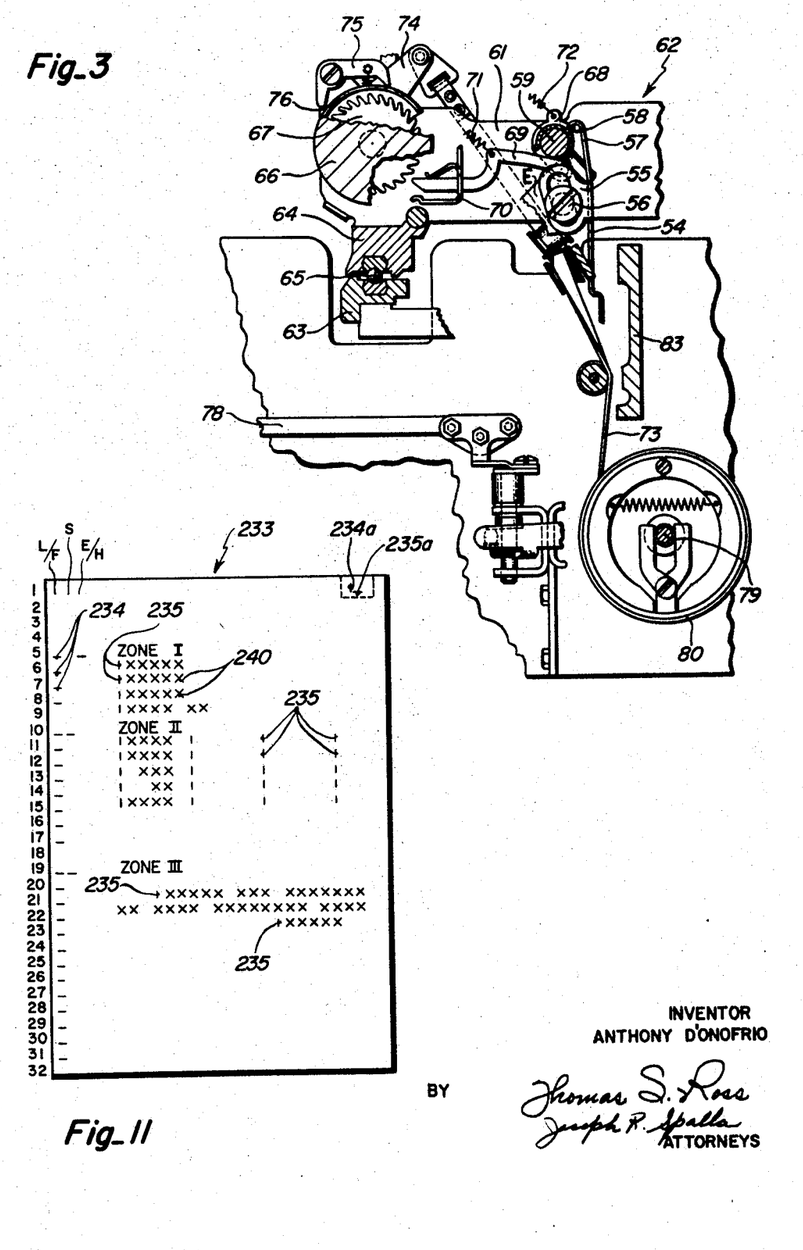
FIGURE 3 is a cross sectional elevation of the platen and feed ratchet.
FIGURE 11 is a plan view of an exemplary form.

As more specifically disclosed in Patent 2,728,438 the repeat line space mechanism comprises a two lobed cam 33 adapted to be driven continuously by means of belt connected pulleys; the driving force being provided by a motor driven shaft 34. The cam follower 29 includes an arm 35 the rear end of which is comprised of a U-shaped part 36 which is mounted both to rock and to slide on a fixed shaft 37 which extends parallel to the cam axis of rotation. A normalizing spring 38 interposed between the follower arm and a collar 39 fixed on the shaft 37 urges the cam follower toward the left to the position shown in FIGURE 2 in which a cam follower roller 41 on the arm 35 is displaced from the plane of cam 33 so as not to be engageable by the cam lobes. When the parts are positioned as shown in FIGURE 2, the follower arm 35 is held up against a stop 42 by a spring 43, the stop 42 so determining the upper or normal position of the follower roller 41 that the roller is closer to the cam axis than is the highest or most radially outward portion of either of the two cam lobes; the follower roller 41 however being further from the cam axis of rotation than the peripherally innermost portions of the cam between lobes 33¹. As will be understood the cam follower 29 is adapted to be moved into engagement with the cam 33 by a repeat line space key depression or by energization of solenoid 27, both of which are adapted to rock a lever 44 pivoted at 45 on the typewriter frame. The rear end of lever 44 is formed with an ear 46 which is connected to the cam follower U-shaped part 36 by a yieldable motion transmitting spring 47, the arrangement being such that when lever 44 is rocked clockwise either by key depression or energization of solenoid 27, the spring 47 will yieldably pull the cam follower 29 toward the right against the urge of the normalizing spring 38 to position the roller 41 in the plane of the cam. The forward end of the cam follower arm is connected to the lower end of an upwardly extending lever arm 54. As seen in FIGURE 3 the lever arm 54 is provided on its upper end with a slotted ear 55 adapted to receive a stud 56 suitably secured to the typewriter escapement frame E whereby lever arm 54 is retained in position and guided in its movement by the stud 56. As seen in FIGURES 2 and 3, the upper extremity 57 of lever arm 54 is bent over so as to engage a flange 58 on a repeat line space bail 59 rotatively mounted in the end plates 61 of a typewriter carriage generally designated by reference numeral 62 which, as is understood, is mounted for movement transversely of the typewriter frame on a frame mounted lower track or rail 63 by means of a carriage or top rail 64 and ball rollers 65 only one of which is shown. The carriage is equipped with the usual cylinder or platten 66 rotatively mounted in the carriage end plates 61 and provided on one of its ends with an indexing ratchet 67. The end of bail 59 adjacent the ratchet 67 is provided with an arm 68 fixedly secured thereto, the lower end of which is pivotally connected to a pawl 69. The pawl 69 is guided by a slotted bracket 70 secured to the carriage top rail and biased by a spring 71 secured to the carriage end plate 61. A bail return spring 72 is also secured to the bail arm and to the carriage end plate.

Energization of solenoid 27 will move the cam follower 29 toward the cam 33, and when the cam roller is between lobes it will move into the plane of the cam so that the latter will depress the cam follower and initiate line feed operation which will continue as long as the key is held depressed or the solenoid remains energized. As will hereinafter appear, if a vertical control mark is sensed during the line feed process it will effect the de-energization of the solenoid, thereby stopping line feed operation.

As shown in FIGURE 3, other known parts of the Royal Electric Office Typewriter include a carriage return draw band 73 connected to a lever 74 which is adapted to rotate a pawl 75 adapted to engage the line space ratchet 67 on the platen so as to automatically effect, prior to return carriage motion, single, double, or triple line spacing each time a carriage return operation is initiated depending on the set position of a shield 76 which determines the time of engagement of the pawl 75 with the ratchet. In accordance with the invention a zero line feed set point is provided by extending the shield 76 with the result that no line spacing will occur by reason of the draw band connection prior to carriage return movement when form sensing.

Figure 4:
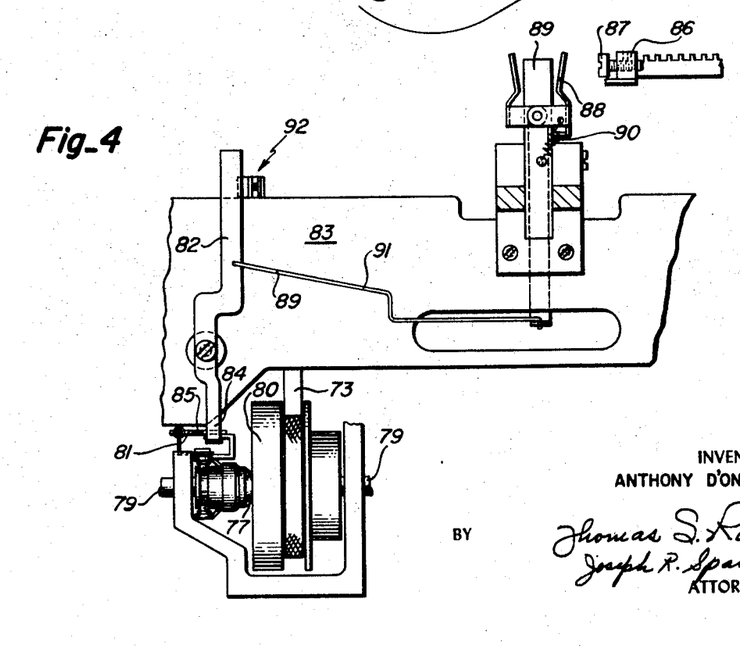
FIGURE 4 is a view of the carriage return clutch knock off mechanism.

The carriage return mechanism includes as seen in FIGURES 3 and 4, a clutch operating cone 77 adapted to be moved toward the right as viewed in FIGURE 4 through movement of carriage return link 78 upon initiation of a carriage return operation so as to effect connection of the typewriter motor power shaft 79 to the draw band drum 80. Details of this structure are more fully described in Patent 2,729,322. In order that the clutch cone 77 may be maintained toward the right until the carriage has reached the end of its return movement, latching means similar in principle to that disclosed in Patent 2,567,937 is employed. In order to release the latching means comprising a latch arm 81 when the carriage reaches the end of its return travel, a knock off lever 82 is provided. As shown in FIGURE 4 the knock off lever 82 is pivotally mounted on the rear typewriter frame 83 and adapted to be rocked clockwise whereby its lower extremity 84 will engage a tail portion 85 of latch arm 81 thereby to release the latching means and permit disengagement of the clutch cone 77. Clockwise movement of the knock off lever is effected as follows: Just before the carriage reaches the end of its return movement determined by the setting of a margin stop 86, a screw 87 on the stop will engage the upper end of a cushion lever 88 pivotally mounted on the center post 89 of the typewriter so as to rock the latter against the urge of a cushioning spring 90. Rocking of cushioning lever 88 pulls a link 91 which is connected to the knock off lever.

In accordance with the invention the Royal Electric construction is modified by the addition of a Form A switch 92 suitably mounted on the frame 83 for actuation by the clutch knock off lever 82 whereby as will hereinafter appear the line feed key puller solenoid 27 will be energized.

Figure 5:
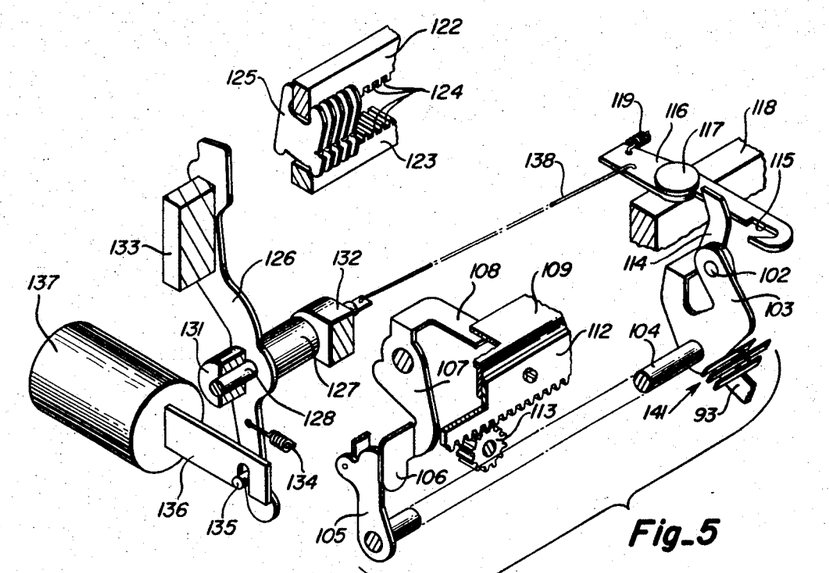
FIGURE 5 is a perspective view showing tabulator mechanism.

Referring now to FIGURE 5 there is shown tabulating mechanism comprising a tabular link 93 adapted to be powered forwardly, as viewed in the figure, through connection with an associated bell crank 26 (FIGURE 1) upon depression of a tabular key. The tabular link 93 is pivotally connected as at 102 to a lever arm 103 fast on a shaft 104 mounted in the typewriter frame whereby, as link 93 moves forwardly, shaft 104 is rocked clockwise. Shaft 104 also has secured thereto a rack bar lifting lever 105 adapted to engage an ear 106 on and to rock counter clockwise a rack bar lifting arm 107 pivoted on the typewriter escapement frame and having an upper arm 108 extending beneath a rack rail 109. When arm 107 rocks counter clockwise the rack rail 109 raises a rack bar 112 out of engagement with the typewriter escapement pinion 113 thereby freeing the typewriter carriage for movement in a letter space direction. Lever arm 103 is also provided with an extension 114 adapted to be engaged by a slot 115 formed in a latch member 116 pivoted as at 117 on a bracket 118 secured to the typewriter frame. A spring 119 interposed between the rear end of member 116 and an ear (not shown) on the bracket 118 urges latch member 116 to rock clockwise so that when lever 103 rocks clockwise extension 114 will move forwardly until it reaches slot 115 whereupon spring 119 will pivot latch member 115 clockwise latching arm 103 and shaft 104 in actuated position whereby the rack 112 will be held out of engagement with the escapement pinion 113.

The tabulating mechanism also includes a support mounted on the carriage comprising upper and lower rack bars 122 and 123, respectively, formed with aligned transverse grooves 124 which are spaced longitudinally of the rack bars at letter space intervals. A plurality of tabular stops 125 are mounted in the grooves of the rack bars and all are mounted on and normally occupy, during form controlled operation, a set position so as to engage a tabulation terminating interposer when the latter is moved to its operative position. In the form shown the tabulation termination interposer is constituted by a tabular stop blade 126 having a boss 127 secured as by a set screw to blade mounting means comprising a shaft 128 mounted for both axial and rocking movement in bearing lugs 131 and 132 on the typewriter center stop bracket 133. The tabular stop blade 126 is normally biased out of engagement with the tab rack by a spring 134 suitably secured thereto and to the typewriter frame. The tabular stop blade 126 is adapted to be moved into the path of a tab stop 125 through connection as at 135 with the armature 136 of a solenoid 137 suitably mounted on the typewriter frame. The tab stop blade 126 is also connected by a link 138 to actuate the latch member 116 to thereby permit the rack 112 to re-engage the escapement pinion 113. In the normal position of the parts tab blade 126 abuts bracket 133 and boss 127 is axially spaced from bearing lug 132; spring 119 being ineffective to move tab blade 126 axially to the right through link 138 because of the abutment of extension 114 with latch member 116.

The above arrangement of tabulating parts differs primarily from the Royal Electric Typewriter in that the tab blade 126 is solenoid actuated rather than being linked for actuation by shaft 104. Further in accordance with the invention a Form C tab latch switch 141 is provided on the typewriter frame and disposed thereon as shown, so as to enable its movable contact to be moved to its transfer position by movement of lever arm 103 to actuated position.

A double Form C switch generally designated by reference 142 (FIGURES 1, 8 and 10) manually operable by a key 143 (FIGURE 1) is adapted to be actuated if it is desired to change from form to manual control as will hereinafter appear. As will be understood when the typewriter is to be operated manually the tab stops 125 will be set manually by a set key as is usual; the normally set stops being reset by holding the clear button and initiating a carriage return operation.

Figure 6:
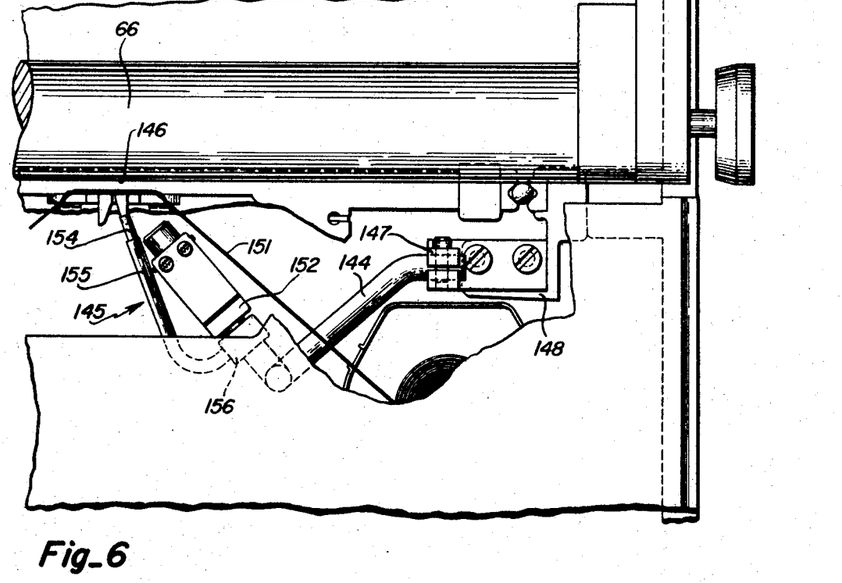
FIGURE 6 is a top view showing the mounting of the sensing unit in relation to the typewriter.
Figure 7:
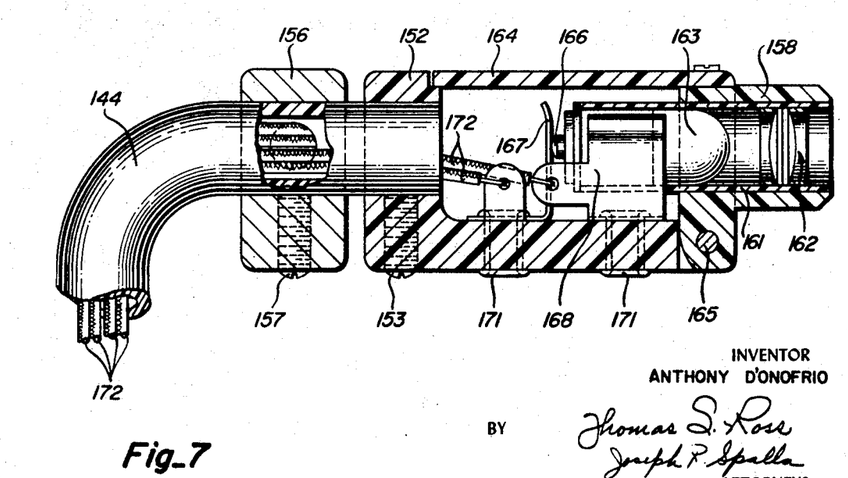
FIGURE 7 is a side view in cross section of the sensing unit.

The photoelectric sensing unit comprises as seen in FIGURES 6 and 7 a support 144 for adjustably positioning a photocell and light source assembly generally designated by reference 145 in the vicinity of the printing station 146 of the typewriter. The support 144 which takes the form of hollow tubing is secured at one end in a split clamping collar 147 secured to the typewriter frame 148 whereby it may be rotatably and longitudinally adjusted. The tubing extends toward the interior of the typewriter below the inked ribbon 151, and upwardly, terminating in a lamp housing 152 wherein it is secured as by a set screw 153 (FIGURE 7). The photocell 154 of the assembly is mounted in tubing 155 which is secured to a collar 156 adjustably secured to support tubing 144 as by a set screw 157. The adjustable mountings are provided whereby the photo cell may be brought close to and preferably to within ⅛" of the printing point on the platen 66.

Referring more particularly to FIGURE 7 the light housing is formed with a lens housing 158 wherein is mounted a sleeve 161 adapted to receive a double convex lens assembly 162 and a lamp 163. The upper and forward portions 164 of the housing are hinged as at 165 whereby the housing may be opened to permit insertion and/or removal of the lamp 163 within or from the sleeve 161. As seen in FIGURE 7 when the housing is closed the base terminal 166 of the lamp contacts a resilient terminal 167 and the sleeve terminal of the lamp is gripped by a C-shaped resilient terminal 168. Terminals 167 and 168 are suitably secured to the lamp housing by rivets 171. Conductors 172 connected to the lamp and photocell are brought through the tubing and connected to control circuitry 154 preferably on printed circuit cards mounted to the rear of the typewriter.

The photocell 154 is of the photoconductive type which, as is understood by those conversant with the art, varies its electrical resistance in accordance with the light intensity received; more particularly the resistance varies inversely with light intensity received. The photoconductive cell used in the invention is preferably one employing diffused silicon as the photosensitive element. Such a photoconductive cell is sold by Texas Instrument Corporation as an 1N2175 and is characterized by a two microsecond rise time, a 20 microsecond decay time, and a high dark current.

The characteristic of such a cell is such that increases in ambient illumination will shift the bias voltage along the load line with the changes in photocell current becoming greater as the level of illumination increases. This indicates that the higher the ambient illumination, the greater the change in photocell current when the illumination drops as by passage of a position control mark past the field of "vision" of the photocell. Hence high ambient light intensity supplied primarily by lamp 163 renders the cell more sensitive.

It is to be understood however that a light source to provide a high ambient light though preferable is not necessary where the ambient light in the surroundings where the typewriter is employed is sufficiently high to provide a high enough signal to noise ratio when the illumination received by the cell decreases as when a non-reflective mark passes into the field of "vision" of the photocell.

The lamp 163 employed in the invention is a tungsten filament lamp operated at a color temperature of 2878K and the light assembly is designed to project the image of the lamp filament. The image spot of light on the printing point preferably is in the form of a rectangle such that rectangular tabular position control marks on a form, preferably .020"×.060", when immediately at the printing point, blank the area defined thereby. The lamp 163 is disposed behind the lens 162 a distance equal to the focal length of the lens and the light lens assembly is mounted so as to deliver approximately one foot candle of illumination at the printing point. The projected light upon hitting the paper on the curved surface of the platen 66 is diffusely reflected. The diffusely reflected light illuminates a volume of space in front of the printing point and it is within this volume that the photoconductive element is disposed. More particularly in order that a high output signal and a good signal to noise ratio may result the photoconductive cell is placed approximately ⅛" from the printing point, slightly away from the projected axis of lens, and out of the path of type bars.

Figure 8:
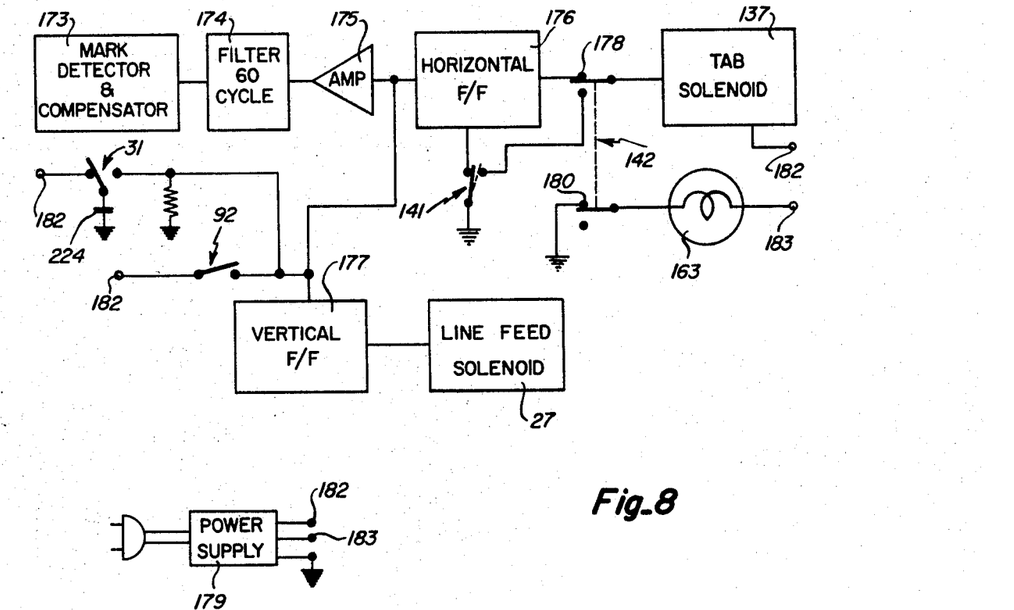
FIGURE 8 is a block diagram of the system circuitry.

Referring now to FIGURE 8 there is shown a block diagram of the system comprising a mark detector and compensator 173 which, as will hereinafter be more fully described, includes circuitry for compensating for changes in surrounding ambient light and changes in reflected light due to paper variations. The output of unit 173 is fed through a filter 174 and to amplifier 175 whose output is connected to a horizontal and a vertical flip-flop circuit 176 and 177, respectively. The output of the horizontal flip-flop 176 is adapted to energize the tab interposer solenoid 137 through contact 178 of the selector switch 142 when in form sensing position. Also lamp 163 is connected in circuit with a power supply 179 through contact 180 when switch 142 is in form sensing position as shown. When a tab operation is initiated tab switch 141 is actuated to its transfer position conditioning flip-flop 176 which, upon receipt of a mark sense signal changes state; the resulting pulse energizing solenoid 137. After tabulation tab switch 141 returns to normal and in so doing flips 176 back to normal de-energizing solenoid 137. Also closure of tab switch 141 as will hereinafter appear prevents line feed during tab.

A line feed is initiated as heretofore stated upon actuation of carriage return switch 92 or skip switch 31 which as heretofore stated is actuated by dummy key 32 on the typewriter keyboard. Closure of either of these switches causes the vertical flip-flop to change state and thereby energize the line feed solenoid which will effect a line feed. If a mark is detected the signal will return flip-flop 177 to its normal state de-energizing solenoid 27.

Figure 9:
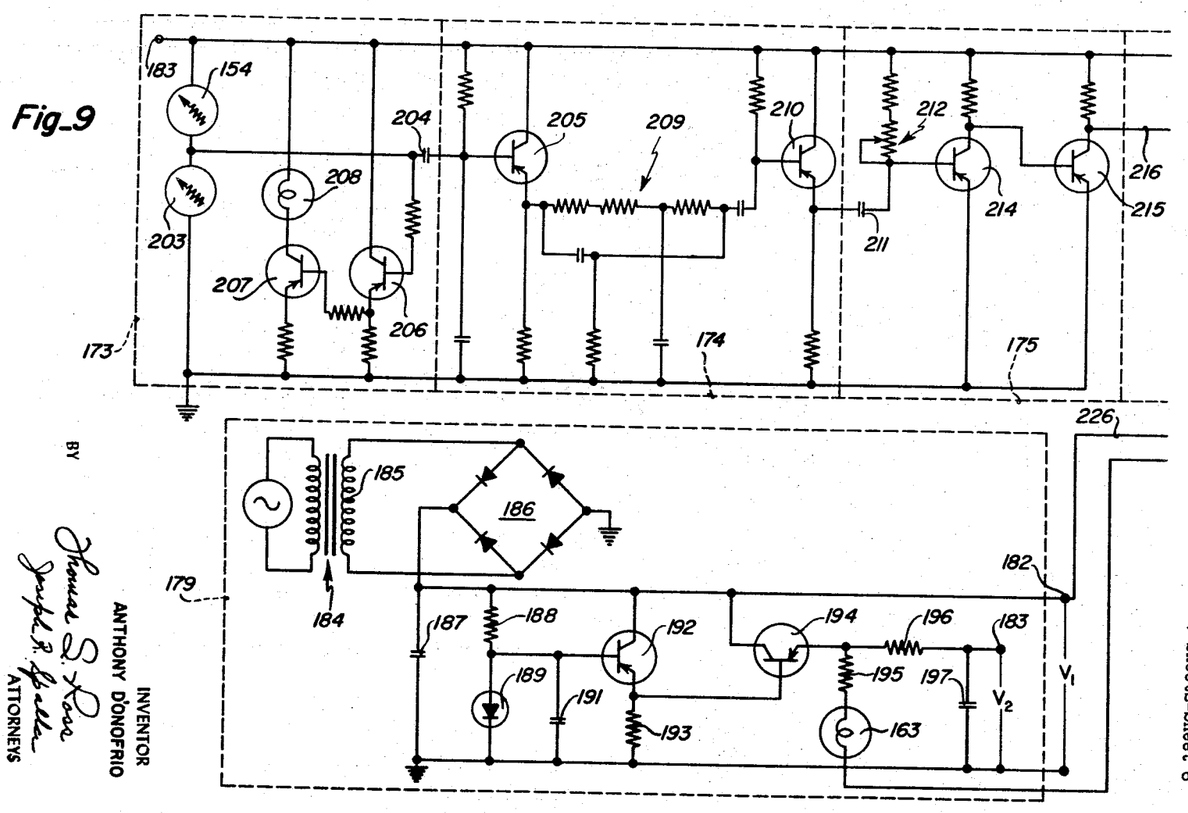
FIGURES 9 and 10 together comprise a schematic diagram of the circuitry of FIGURE 8.

The power supply 179 as shown in FIGURE 9 is adapted to deliver an unregulated D.C. voltage $V_1$ across terminal 182 and ground and a regulated D.C. voltage $V_2$ across terminal 183 and ground, the regulated voltage being necessary so that the sensitivity of the system will not vary with voltage fluctuations. The regulated and unregulated D.C. voltages are obtained from a 110 volt A.C. source through a step downtransformer 184; the secondary winding 185 of which is connected to the diagonals of a full wave bridge rectifier 186 whose opposite diagonals are connected across a shunt capacitor 187 thereby developing an unregulated voltage on terminal 182. In parallel with the shunt capacitor 187 is a resistor 188 in series with a zener diode 189 shunted by a capacitor 191. A PNP power transistor 192 having its base and emitter electrodes connected across capacitor 191 is connected for operation as an emitter follower; the voltage across the emitter resistor 193 being connected to the base electrode of a PNP transistor 194 having its emitter connected to ground through a resistor 195, the lamp 163 providing the light source for the mark detecting photocell 154, and contact 180 (FIGURE 10) of the format control switch 142. The emitter of transistor 194 is also connected to ground through a resistor 196 and a filter capacitor 197 in parallel with the lamp circuit. The regulated voltage across capacitor 197 is employed to supply the system components. The zener diode 189 as is understood sets the base voltage of the regulator transistor 192 by passing current when the voltage exceeds the desired bias due to voltage fluctuations of the power supply.

As seen in FIGURE 9 a voltage divider is provided comprising the mark detector photocell 154 and a light and paper variation compensating photocell 203. The output of the divider is coupled through a condensor 204 to a PNP transistor emitter follower 205 and is also directly connected to the base electrode of an emitter follower transistor 206. The emitter of transistor 206 is connected to the base electrode of a transistor amplifier 207 having a lamp 208 connected in its collector circuit. The lamp 208 is associated with the light and paper variation compensating photocell 203. The response time of photocell 203, preferably a Clairex CL-2, is much slower than the response time of the mark detector photocell, being on the order of 20 milliseconds. Preferably both the photocell 203 and lamp 208 are mounted on a printed circuit card suitably mounted at the rear of the machine; the printed circuit card also carrying the transistors, capacitors and resistors employed.

The mark detector photocell 154 located approximately ⅛″ from the platen as heretofore stated will change its resistance when sensing a mark, i.e. when a mark passes the printing point, the light directed thereon by lamp 163 is absorbed rather than reflected so that the intensity of illumination in the volume of diffused light within which the cell is located decreases, and as a consequence its resistance increases. The change in resistance will change the divider output voltage which will then be amplified for control purposes. The compensating photocell 203 comprising the divider is adapted to reduce changes in divider output voltage due to surrounding ambient light variations and paper variations affecting the amount of reflected light. As the divider voltage tends to change due to such variations, which variations occur only gradually, the change is effective through transistors 206 and 207 to increase or decrease the output of lamp 208 and thereby decrease or increase the resistance of compensating cell 203 thereby keeping the output voltage of the divider constant. When sensing a mark the resistance of detector cell 154 increases and the pulse resulting is of such short duration, due to the fast rise and decay response time of the cell 154, that no compensation by the more slowly acting compensating cell 203 can be effected.

The mark sense pulse at the emitter of transistor 205 is passed through the filter section 174 comprising a twin T filter generally designated by reference character 209 to keep the input to the amplifier section 175 free of 60 cycle noise pickup due to the high impedance of the voltage divider. The filter output is in turn applied to the base electrode of an emitter follower transistor 210 which together with emitter follower transistor 205 matches the high impedance output of the signal source to the low impedance input to the amplifier 175 comprising cascaded PNP transistors 214 and 215.

Figure 10:
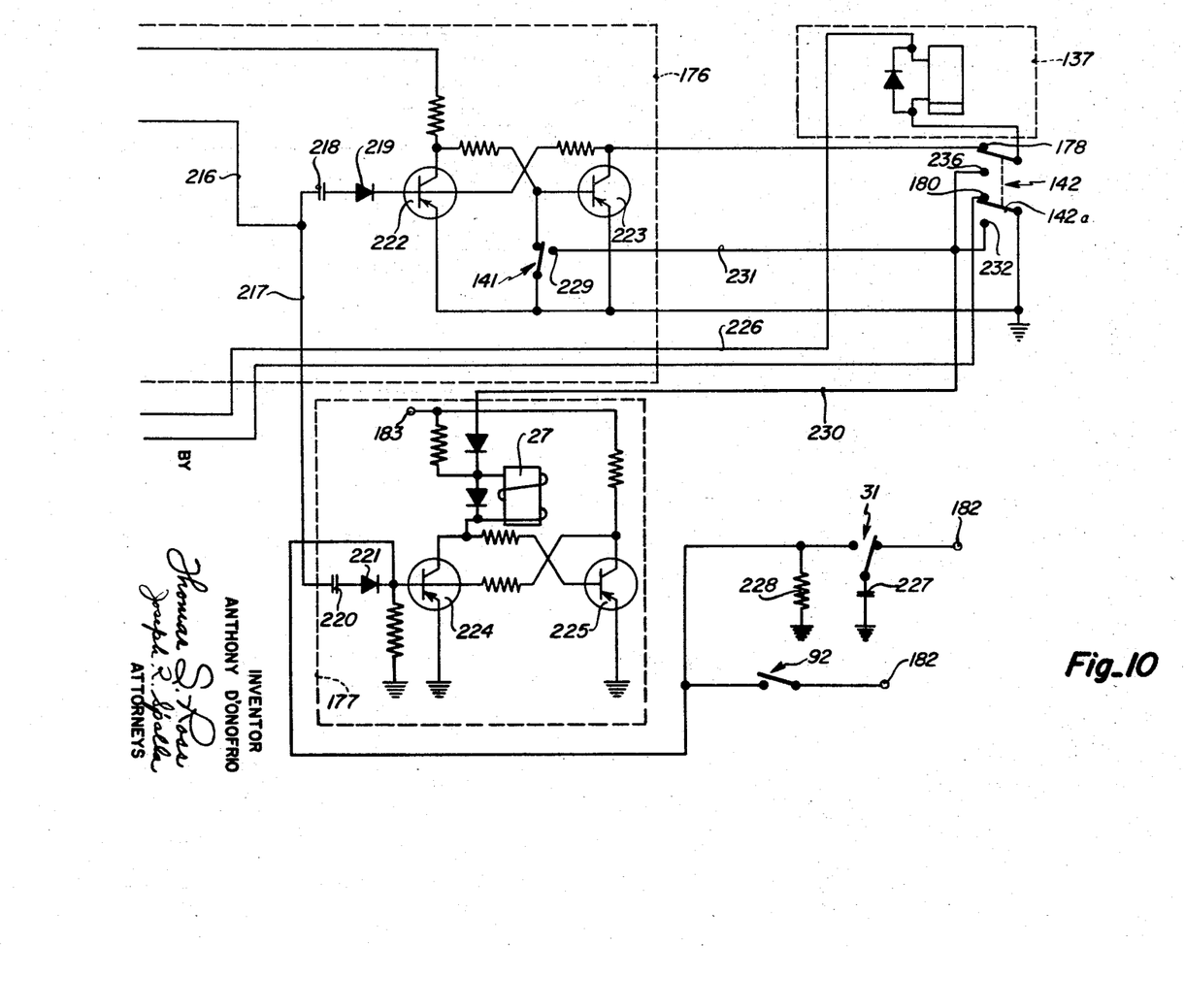

The voltage developed across the emitter resistor of transistor 210 is coupled through a condensor 211 to the amplifier section 175 through a bias rheostat 212 whereby the amplified output signal level may be controlled so as to reduce the amplitude of noise to an ineffective level and signal voltage amplitudes developed by marks less than a predetermined width to an ineffective level. As shown in FIGURE 10 the amplifier output is coupled via conductors 216 and 217 respectively to the horizontal and vertical flip-flops through capacitors 218 and diodes 219 and 220 and 221, respectively, adapted to pass positive pulses.

Both the horizontal and vertical flip-flops are of conventional construction. The horizontal flip-flop comprises PNP transistors 222 and 223 and the vertical comprises transistors 224 and 225. The base electrode of transistor 223 is normally returned to ground through the normally closed contacts of tab switch 141 and the collector electrode is normally connected through contact 178 of format control switch 142 and the tab solenoid 137 to the negative supply terminal 182 via conductor 226. Transistor 222 is normally conducting and the positive pulses passed by diode 219 are ineffective to change the state of the flip-flop as long as the tab switch 141 is in its normal position as shown.

As shown the line feed solenoid 27 is connected in the collector circuit of transistor 224 in the vertical flip-flop; transistor 224 being normally nonconductive. The output of the amplifier, which is coupled through condensor 220 and diode 221, the latter being poled to pass positive pulses to the base of transistor 224, is therefore normally ineffective to change the state of transistor 224 and the flip-flop. A negative pulse is adapted to be connected to the base of transistor 224 upon closure of the carriage return switch 92 which connects terminal 182 to the base of transistor 224 or upon closure of the skip switch 31. As shown the skip switch 31 comprises a Form C contact which normally connects terminal 182 to a capacitor 227 whereby it is normally charged so that upon skip key depression capacitor 227 will discharge through a resistor 228 and apply a negative pulse to the base of transistor 224. Either of the negative pulses will render transistor 224 conductive and transistor 225 nonconductive. This will energize solenoid 27 whereby a line feed will be effected. If during a line feed operation a mark is detected the resulting positive pulse will render transistor 224 nonconductive and solenoid 27 will be de-energized. If no marks are detected line feed will continue until one is sensed.

As seen in FIGURE 10 the collector electrode of transistor 224 is also connected through properly poled diodes to the stationary contact 229 of the tab switch 141 via conductors 230 and 231 and to contact 232 of switch 142 whereby transistor 224 will be rendered ineffective during tab or when the switch contact 142a is in manual position due to its collector being effectively connected to ground potential.

Referring now to FIGURE 11 there is shown a form 233 upon which data is to be inserted. The form carries an exemplary program comprising line feed control marks 234 and tabulating control marks 235. It is to be here noted that the form does not have to be specially prepared inasmuch as control marks may be pencilled or inked in by hand. However, a prepared form with marks printed thereon in accordance with a particular format is preferred; with the line feed control marks 234 positioned between typing lines, and with the tabulating control marks 235 positioned to coincide with the tabular stops. The thickness of the control marks is not critical inasmuch as the sensitivity of the mark detector amplifier may be adjusted so that only marks of a predetermined thickness or greater will be operative to effect control. Preferably the thickness of the tabulate control marks is equivalent to the width of the light spot directed toward the print point. This means that the greatest change in reflected light and consequently photocell resistance will occur when the mark is centered on the spot of light. The signal amplitude resulting from a change in resistance due to the detection of a mark whose width is less than predetermined will not be effective to operate the flip-flops as heretofore explained through adjustment of rheostat 212. As will be more clearly evident hereinafter the tabulating marks are selectively printed immediately before the spaces at which data 240 is to be entered after a tabulating operation and the line feed marks are selectively located in every position immediately before the line where data is to be entered. This means that the marks are effective to halt carriage and line feed movement.

As shown in FIGURE 11 the left hand margin of the form is provided with three columns designated line feed (L/F), skip (S) and eject or home (E/H); each of these columns carries line feed control marks selectively printed thereon. The marks in the L/F column normally control line feed mechanism operation. The S or E/H column may be employed to control line feed mechanism operation simply by letter spacing one or two spaces respectively through space bar depression thereby placing the S or E/H column in line with the printing station.

With the form shown in FIGURE 11, or a continuous form, a pin feed platen being provided for the latter as will be understood, rolled into the machine, an operator may align the form through the use of vertical and horizontal positioning marks 234a and 235a provided on the top line of the form. Also switch 142 will be placed in form sensing position.

As shown typing is to begin in a zone I of the form, the first line of typing thereon being on line 6 of the form. To get to line 6 an operator is required to initiate a carriage return operation to bring column L/F beneath the printing point of the typewriter, the right hand margin stop 86 having been so set.

Depression of the carriage return key effects the engagement of its associated pawl 24 with the snatch roll whereby the carriage return link 78 is pulled. This effects the engagement of the carriage return clutch, latching it over the carriage return interval. When the margin stop 86 carried by the carriage strikes the frame mounted center post the carriage return knockoff lever 82 is rocked about its pivot thereby momentarily closing switch 92. Upon return of lever 82 to normal, the switch 92 operated thereby reopens. The momentary closure of switch 92 renders transistor 224 conductive whereupon the line feed solenoid 27 is energized to initiate line feed operation by pulling cam follower 29 into the plane of cam 33. Line feeding will continue until a mark is detected during a line feed operation. Detection of a vertical control mark will return the vertical flip-flop to normal by cutting off transistor 224 thereby deenergizing solenoid 27.

Referring again to the form shown in FIGURE 11 it will be apparent that upon initiation of a carriage return operation, line feed operation will be initiated as explained above and, due to the absence of marks on the form between lines 1-5, will continue through four cycles. Inasmuch as a mark is present between lines 5 and 6, when the platen rotates through its fifth cycle, the mark will be detected and thereby stop line feed operation. Hence line 6 will be positioned on the typing line.

As shown, line 6 has only one tab position mark 235 thereon; typing being required immediately thereafter. Movement of the carriage is effected by depression of the tabulator key which as heretofore stated releases the carriage for tabulating movement and effects the closure of tab switch 141 which conditions flip-flop 176 for the receipt of a signal by removing ground from the base of transistor 223 and disables flip-flop 177 by connecting ground to the collector of transistor 224. Movement of the carriage carries the tab positioning mark past the printing point whereat it is detected by the photoconductive cell thereby applying a positive pulse to transistor 222 which ceases conduction thereby applying a negative potential to the base of transistor 223 which conducts thereby providing a current path between power terminal 182 and ground through the tab interposer solenoid 137. Energization of solenoid 137 pulls the tab interposer blade 126 into the tab rack where it is engaged by the tab stop immediately after the one corresponding to the mark sensed, thereby arresting carriage movement. Engagement of the tab blade also releases latch 114 whereupon switch 141 returns to normal and transistor 223 ceases conduction and transistor 222 resumes conduction.

The time interval between the sensing of a mark and the movement of blade 126 is less than the time it takes the carriage to move a distance equivalent to the horizontal pitch of the machine even at maximum carriage velocity, i.e. the velocity obtained when the carriage moves through its maximum tabulating distance. After writing on line 6, the operator will call for a carriage return which will effect a line feed as heretofore explained and since a mark is present between lines 6 and 7, no further line feed will occur.

After tabulating and carriage returning in line 7 only a single line feed will obtain inasmuch as a mark is present between lines 7 and 8. The same is true after carriage returning in line 8. Carriage returning on line 9 will also effect a line feed but during the feed between lines 9 and 10 no mark will be sensed thereby permitting another line feed. Since there is a mark between lines 10 and 11, line feed will stop with the form positioned to receive typing on line 11.

To insert typing in zone II an operator need only tab and carriage return to properly position the form to the indicated typing positions and to effect line feeds between lines. If all the space alloted to zone II is not required as for example only lines 11-15 were necessary, the operator may move the form to zone III by effecting repeated carriage return operations which will bring lines 16-18 to the printing line successively; line feed operation stopping on each line. A carriage return in line 18 will effect two line feed operations due to the absence of a mark between lines 18 and 19 thereby bringing line 20, the first line in zone III, to the printing line. Another method of moving from line 16 to line 20 which is preferred may be effected by letter spacing the carriage on line 16 to bring the skip column before the print station and then depressing the skip key which initiates a line feed operation by energizing solenoid 27 as heretofore described. Since the skip column is now before the print station, the absence of marks therein between lines 16, 17, 18, 19 will automatically permit repeat line space operations until line 20 is at the printing line.

Typing in zone III will be as in zone II, tabbing and carriage returning effecting form progress. After typing in the last line e.g. line 22, an operator may eject the form by carriage returning repeatedly, or by carriage returning, and then letter spacing one space to the skip column and then depressing the skip key.

Where continuous forms are employed an operator may move from the last line of typing in one form to the first typing line in zone I of the next form by carriage returning; letter spacing two spaces to bring the home control column beneath the printing station and then depressing the skip key. As seen line spacing will continue until a mark in the home column is sensed which will be between lines 5 and 6 of the next form, assuming the next form has the same format as the one preceding it.

In similar fashion overflow, the condition where the space alloted in a zone is insufficient, may be accommod:ted in a corresponding zone in a succeeding form by providing an overflow column, similar to the other three with a mark disposed before the line at which typing is to resume in the next form.

As apparent from the above, if automatic control is not required or desired, an operator may move switch 142 to manual position. This disables the horizontal flip-flop through disconnection of supply voltage from the collector of transistor 223 and disables the vertical flip-flop by grounding the collector of transistor 224 via contact 232 of switch 142 and conductor 230. Also as seen in FIGURE 10, movement of switch 142 to manual position also connects the high side of the tab interposer solenoid to contact 229 of switch 141 whereby when a tab operation is initiated with the resulting closure of switch 141, the high side of solenoid 137 will be connected to ground. The above permits the tab solenoid to be employed during manual operation.

To obtain line feed operation while in manual only requires that the shield 76 (FIGURE 3) be positioned so as to effect single, double, or triple line spacing immediately before a carriage return operation when such an operation is initiated. Repeat line feed operation will be as described, the lever 44 being operated by a key depression.

It will also be understood that after the switch 142 has been moved to manual, an operator will be required to clear all the tab stops and reset them where desired in conventional fashion; the set stops cooperating with the solenoid operated tab blade as heretofore explained.

It should be understood, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. In a typewriter having a frame and a carriage mounted for movement on said frame in tabulating and carriage return directions, said carriage including a platen adapted to be indexed whereby a worksheet having marks thereon and supported by said carriage may be fed in horizontal and vertical directions, means for initiating tabulating movement, means for initiating indexing movement of said platen, signal generating means for generating signals when said marks are passing immediately before the typewriter printing station, means responsive to signals generated during tabulating movement for stopping tabulating movement of said carriage, and means responsive to signals generated during indexing movement of said platen for stopping indexing movement of said platen.

2. In a typewriter having a carriage adapted for movement in tabulating and return directions, said carriage having mounted thereon a platen adapted to be indexed whereby a worksheet supported by said carriage may be fed in horizontal and vertical directions, said worksheet having marks thereon for controlling the extent of tabulating movement of said carriage and for controlling the extent of indexing movement of said platen, means for detecting said marks during their passage past the printing station of said typewriter, means for effecting tabulating movement of said carriage, means for effecting indexing movement of said platen, and means responsive to detected marks during said tabulating movement for stopping said carriage and to detected marks during said indexing movement for stopping said indexing movement.

3. In a typewriter having a carriage adapted for movement in tabulating and return directions, said carriage having mounted thereon a platen adapted to be indexed whereby a worksheet supported by said carriage may be moved in horizontal and vertical directions relative to the printing station of said typewriter, said worksheet having first marks printed thereon immediately before selected carriage stopping positions and second marks printed thereon at positions immediately before desired typing lines, means for initiating tabulating movement of said carriage, means for initiating indexing movement of said platen, means for detecting marks during passage past said printing station, control circuitry, first means in said control circuitry conditioned upon initiation of said tabulating movement, and second means in said control circuitry conditioned upon initiation of indexing movement of said platen, said first conditioned means being responsive to sensed first marks for stopping tabulating movement, said second conditioned means being responsive to sensed second marks for stopping platen indexing movement.

4. In a typewriter having a carriage adapted for movement in tabulating and return directions, said carriage having mounted thereon a platen adapted to be indexed whereby a worksheet supported by said carriage may be moved in horizontal and vertical directions relative to the printing station of said typewriter, said worksheet having marks thereon at selected positions for controlling horizontal and vertical movement of said worksheet, mark sensing means mounted on said typewriter for generating a signal each time a mark passes said printing station, said mark sensing means comprising a photocell mounted within a volume of diffused light reflected from the worksheet in front of said printing station, said photocell being responsive to decreases in the level of illumination in said volume of diffused light due to passage of a mark past said printing station, means for initiating tabulating movement of said carriage, means for initiating a carriage return movement, means for initiating indexing movement of said platen at the termination of carriage return movement, means responsive to the first signal generated by said mark sensing means during a tabulating movement for stopping tabulating movement, and means responsive to the first signal generated by said mark sensing means during platen indexing movement for terminating indexing movement.

5. In a typewriter having a carriage adapted for movement in tabulating and return directions, said carriage having mounted thereon a platen adapted to be indexed whereby a worksheet supported by said carriage may be moved in horizontal and vertical directions relative to the printing station of said typewriter, said worksheet having marks thereon at selected positions for stopping platen indexing movement, a photocell for generating a signal in response to changes in illumination at the printing station of said typewriter due to movement of a mark past said printing station, control circuitry, means for initiating a carriage return operation, and means in said control circuitry conditioned in response to termination of a carrage return operation to initiate a platen indexing movement after a carriage return, said conditioned means being operable in response to the first signal generated by said photocell during said platen indexing movement for terminating platen indexing movement.

6. In a typewriter having a frame end a carriage adapted to support a worksheet having marks selectively positioned thereon immediately before selected letter space positions movably mounted on said frame, means for effecting tabular operations of said carriage, a tabular stop blade having a normal inoperative position and an operative position, tabular stop means positioned for engagement by said operatively positioned tabular stop blade, stationary mark sensing means mounted on said typewriter frame for generating signals in response to the passage of said marks immediately in front of the printing station of said typewriter, control circuitry adapted when conditioned to operatively position said tabular stop blade in response to signals generated by said mark sensing means during tabulating movement, and means responsive to the initiation of a tabulating operation for conditioning said control circuitry.

7. Apparatus as recited in claim 6 wherein said mark sensing means comprises a light source for directing light to the worksheet immediately in front of the printing station of said typewriter, and a photoconductive cell disposed within the volume of light diffusely reflected from said worksheet.

8. The combination with a type writer having a carriage adapted for movement in tabulating and return directions and a platen mounted for rotation on said carriage adapted to be indexed whereby a worksheet supported by said carriage may be moved horizontally and vertically with respect to the printing station of said typewriter, said worksheet having marks adapted to be sensed whereby the horizontal and vertical progress of the worksheet may be automatically controlled, of a light source mounted to direct a spot of light on said platen immediately in front of said printing station thereby to form a volume of diffusely reflected light between said worksheet and said printing station, a photoconductive cell mounted within said volume of light responsive to changes in the intensity of light reflected from said worksheet immediately in front of said printing station as a result of the passage of said marks past said printing station, tabulation terminating means, line feed actuating means, first circuit means adapted when conditioned to render said tabulation terminating means effective in response to output signals from said cell, means for initiating a line feed operation, second circuit means adapted to render said line feed actuating means effective in response to initiation of line feed operation and ineffective in response to output signals from said cell, means connecting said photocell output to said first and second circuit means, and means responsive to the initiation of tabulating movement for conditioning said first circuit means and for rendering said second circuit means ineffective.

9. Apparatus as recited in claim 8 wherein said means connecting said photocell output to said first and second circuit means comprises a second photocell having a slow response time relative to said mark responsive photocell, an associated light source, said mark responsive photocell and said second photocell comprising a voltage divider circuit, and means responsive to said divider output for increasing or decreasing the output of said associated light source in response to slow changes in ambient light whereby said divider output remains unchanged except for rapid changes in ambient light.

10. The combination with a typewriter having a carriage adapted for movement in tabulating and return directions and a platen mounted for rotation on said carriage adapted to be indexed whereby a worksheet may be moved horizontally and vertically with respect to the printing station of said typewriter, said worksheet having marks selectively printed thereon and adapted to be detected whereby the progress of said worksheet may be controlled, a photoconductive cell responsive to changes in the light reflected from said worksheet immediately before said printing station as a result of the passage of said marks past said printing station, a flip-flop circuit, a tabulation terminating device in the normally nonconductive half of said flip-flop circuit, means normally maintaining said flip-flop circuit nonresponsive to signals from said photoconductive cell, and means operable in response to a tabulating operation for actuating said last named means whereby said flip-flop circuit is rendered responsive to signals from said photoconductive cell.

11. A printing machine having a movable carriage for supporting a worksheet for movement past the printing station of said machine, said worksheet having marks selectively printed thereon for controlling the progress of said worksheet relative to said printing station, means comprising electromagnet means for effecting movement of said worksheet relative to said printing station, a flip-flop circuit, said electromagnet means being connected in the normally nonconducting half of said flip-flop circuit, means for switching said flip-flop circuit to its other than normal state whereby said electromagnet means is energized, and detector means responsive to the passage of marks past said printing station for switching said flip-flop circuit back to its normal state when said marks are positioned immediately in front of said printing station.

12. Apparatus as recited in claim 11 wherein said detector means comprises a light source mounted on said machine to direct a spot of light on said worksheet immediately in front of said printing station, and a photoconductive cell mounted within the volume of light diffusely reflected from the worksheet immediately before said printing station, said cell being responsive to changes in light intensity in said volume of light upon passage of a mark past said printing station.

13. The combination of a printing machine having a carriage adapted for movement in letter feed and carriage return directions, and a platen mounted for rotation in said carriage adapted to be indexed whereby a worksheet supported by said carriage may be moved horizontally and vertically with respect to the printing station of said machine, said worksheet having marks selectively placed thereon in accordance with a predetermined formate for controlling the progress of said worksheet relative to said printing station, a light source for directing a spot of light on said worksheet immediately before said printing station, a photoconductive cell responsive to decreases in light intensity in a volume of light diffusely reflected from said worksheet immediately in front of said printing station due to passage of marks past said printing station, means for initiating movement of said worksheet, and means adapted to be controlled by said cell output for terminating the progress of said worksheet.

14. Apparatus as recited in claim 13 wherein said movement initiating means comprises mechanism for releasing the carriage for unrestricted movement in letter feed direction, and said means adapted to be controlled by said cell output comprises a normally ineffective control circuit, and electromagnet means in said control circuit for terminating carriage movement, said control circuit being rendered effective upon the initiation of said carriage movement whereby said cell output is effective to energize said electromagnet means.

15. Apparatus as recited in claim 13 wherein said movement initiating means comprises a bi-stable circuit normally in one of its two stable states and electromagnet means in said circuit adapted when energized to initiate platen indexing movement, and switch means operable at the termination of carriage return mechanism for reversing the normal state of said circuit whereby said electromagnet means is energized, said cell output being effective to return said circuit to its normal state whereby said electromagnet means is de-energized and platen indexing ceases.

16. In combination with a typewriter having a carriage adapted for movement in letter space and return directions and a platen rotatably mounted on said carriage whereby movement of a worksheet supported by said carriage may be controlled in horizontal and vertical directions relative to the printing station of said typewriter, carriage tabulating mechanism, platen indexing mechanism, said worksheet having marks thereon adapted to control the carriage tabulating mechanism and the platen indexing mechanism, said marks for controlling said platen indexing mechanism being located in columns adjacent the left hand margin of said worksheet, first operator controlled means for selectively positioning one of said columns in line with said printing station, second operator controlled means for initiating operation of said platen indexing mechanism whereby marks in the selected one of said columns will be effective to exercise control over said mechanism, a light source comprising means for directing a spot of light on said worksheet immediately in front of said printing station, a photoconductive cell disposed within the volume of light diffusely reflected from said spot, said cell developing an output signal when a mark passes through said spot, and means responsive to said output signal for terminating operation of said platen indexing mechanism.

17. Apparatus as recited in claim 16 further comprising means for compensating for changes in the intensity of reflected light due to paper variations, said means comprising a second photoconductive cell and associated light source, said mark detector cell and said second cell forming a voltage divider circuit, and means connecting the output of said circuit to said associated light source so as to increase or decrease the output of said associated light source in response to said variations, thereby to vary the resistance of said second photocell whereby the output of said divider is maintained constant.

18. In a typewriter having a frame, a carriage mounted for movement on said frame, tabular stops on said carriage, said carriage being adapted to support a worksheet having marks printed thereon opposite selected tabular stops, a tabular blade mounted on said frame for movement from an inoperative to an operative position in the path of said tabular stops, means for initiating tabulating movement of said carriage, means for directing a spot of light of the same dimensions as said marks on said worksheet immediately in front of the typewriter printing station, a photoconductive cell for generating signals in response to decreases in the intensity of light diffusely reflected from said worksheet when a mark is centered on said light spot immediately before said printing station, means responsive to signals generated during tabulating movement, and means operative by said last named means for moving said tabular blade from inoperative to operative position thereby to terminate tabulating movement.

References Cited in the file of this patent

UNITED STATES PATENTS

| | | |
|---|---|---|
| 2,111,619 | Fleming | Mar. 22, 1938 |
| 2,818,961 | Toeppen | Jan. 7, 1958 |
| 2,860,759 | Clark | Nov. 18, 1958 |
| 2,902,137 | Toeppen | Sept. 1, 1959 |